A. H. AND G. M. MOMEYER.
WHEEL RIM.
APPLICATION FILED AUG. 21, 1920.
1,394,330.
Patented Oct. 18, 1921.
2 SHEETS—SHEET 1.
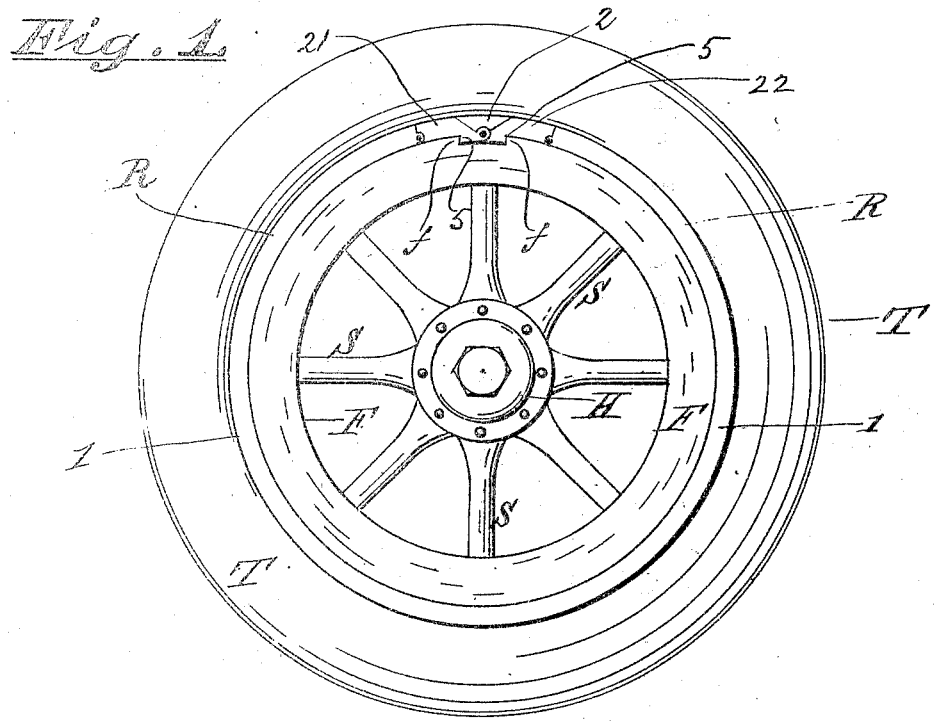
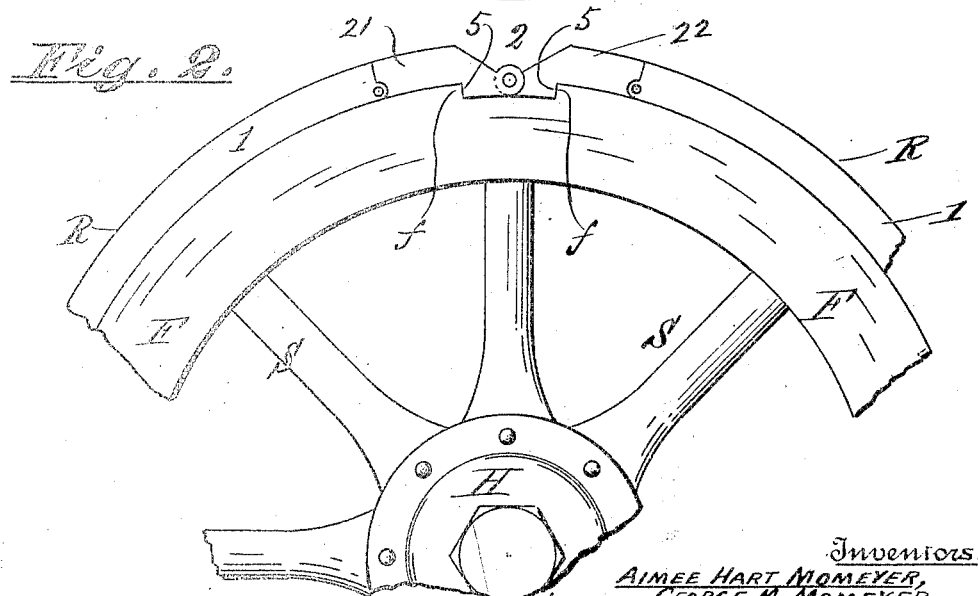
Inventors:
AIMEE HART MOMEYER,
GEORGE M. MOMEYER,

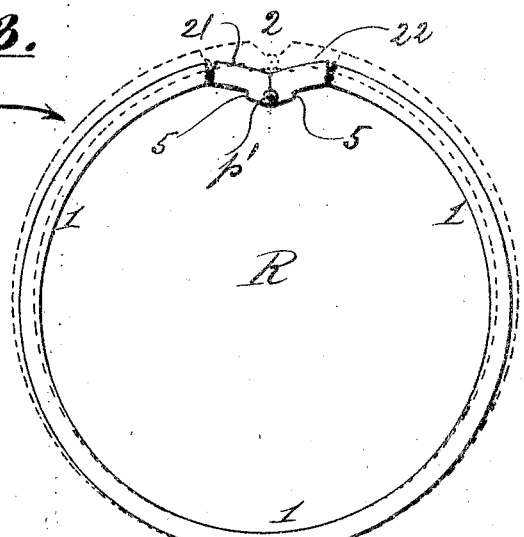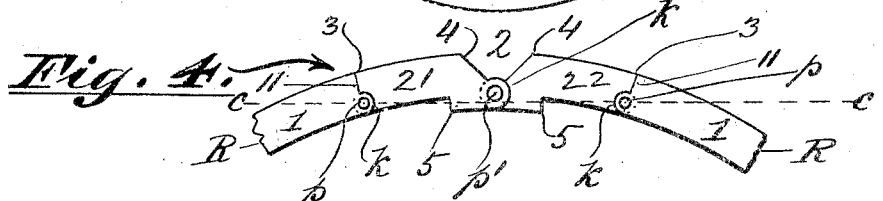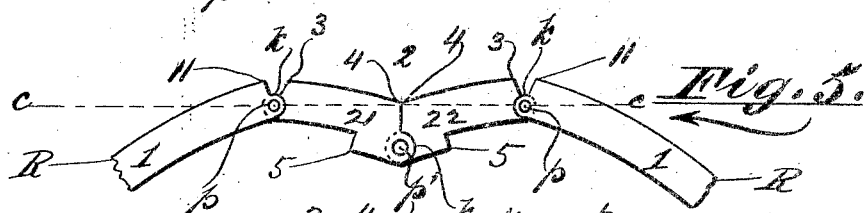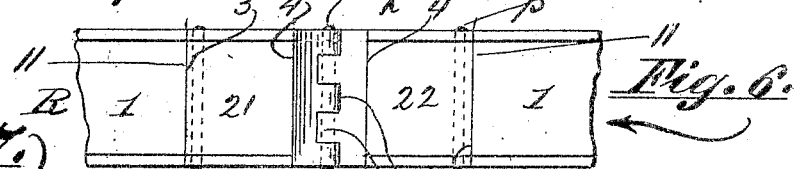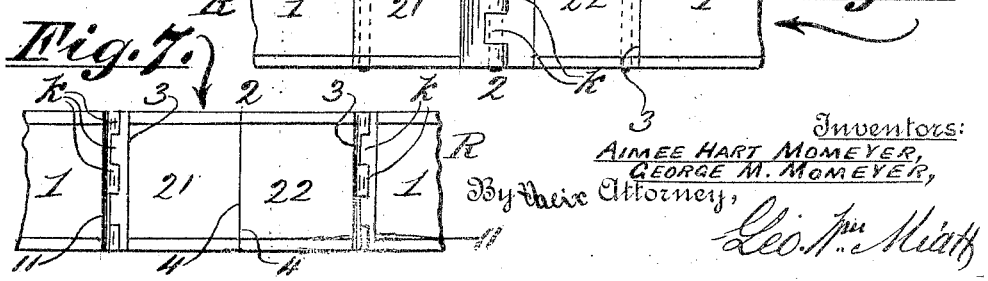

UNITED STATES PATENT OFFICE.

AIMEE HART MOMEYER AND GEORGE M. MOMEYER, OF BROOKLYN, NEW YORK.

WHEEL-RIM.

1,394,330.  Specification of Letters Patent.  Patented Oct. 18, 1921.

Application filed August 21, 1920. Serial No. 405,027.

*To all whom it may concern:*

Be it known that we, AIMEE HART MOMEYER and GEORGE M. MOMEYER, citizens of the United States, and residents of the borough of Brooklyn, county of Kings, city and State of New York, have invented certain new and useful Improvements in Wheel-Rims, of which the following is a specification.

Although applicable generally to vehicle wheels having elastic resilient treads, our improved demountable rim is designed more particularly for use in conjunction with automobile wheels on which pneumatic tires are mounted,—our main object being to facilitate the positioning of the pneumatic tire and shoe on the rim preparatory to the mounting of the latter on the felly of the wheel.

Heretofore, in demountable rims the shoe or tread containing the pneumatic tire has been forced laterally onto the rim with considerable difficulty because the peripheral diameter of the rim is practically and necessarily approximately the same as the inner or shorter diameter of the tread so as to insure a close fit between the parts named. For this reason, as is well known in the art, the operation of tire replacement is tedious and difficult, and requires both skill and patience,—the tread having to be pried into position on the rim.

The object of our invention is to obviate this difficulty by providing means whereby the rim may be fitted to the tread instead of the tread to the rim as heretofore; and the invention consists essentially, in combination with a peripherally recessed and shouldered felly, of a rim formed with a toggle joint section which, when the rim is removed from the wheel felly, may be retracted or depressed, thereby collapsing the rim sufficiently to admit of its removal from or insertion peripherally within the inner or concave circumference of the tread, the forcible return of the toggle to normal position in annular alinement with the rim causing the latter to expand against the tread and lock itself and said tread in position for installation on said recessed and shouldered felly of the wheel, as hereinafter fully set forth, and described and claimed specifically.

In the accompanying drawings,

Figure 1, is an elevation of an automobile wheel provided with one of our improved demountable rims;

Fig. 2, is an elevation, upon a larger scale, of a portion of the wheel and rim;

Fig. 3, is an elevation of our demountable rim collapsed, the normal or expanded position being indicated by dotted lines;

Fig. 4, is a detail of the toggle section of the rim on a larger scale, in expanded normal position;

Fig. 5, is a similar view showing the toggle section depressed;

Fig. 6, is a view of the outer side of the toggle, positioned as in Figs. 1 and 4;

Fig. 7, is a similar view of the outer side of the toggle, positioned as in Fig. 5.

In Figs. 6 and 7 the tire-retaining flanges are omitted for the sake of clearness.

The reference letters H, represent the hub, S, the spokes, and F, the felly of an automobile wheel, of any ordinary construction. T, Fig. 1, represents a shoe or tread incasing a pneumatic tube in the usual way, and mounted on our demountable and collapsible rim R. The tread T, may be supported on the rim R, and the latter on the wheel felly F, by any of the devices well known in the art, and which form no part of our invention, the main novelty of which consists in the specific construction of the rim R, with a toggle shouldered section, so as to render the rim collapsible and expansible, and adapted for use in conjunction with a recessed and shouldered felly as herein described.

Our rim R, consists of a major section 1, of elastic resilient metal, and a minor or toggle section 2, also preferably of metal. The toggle section 2, consists of the two levers 21, 22, articularly connected to each other medially, and also articularly connected at their opposite ends to the extremities of the major section 1, of the rim.

By the term articular connection as herein used we mean to designate any coupling together of the parts that will admit of the flexure of the toggle section 2, as related to the main section 1, of the rim substantially as and for the purpose herein set forth. Thus, by way of exemplification in the accompanying drawings, we show the parts as hinged together by pintlets $p, p'$, passing through the usual interlocking knuckles $k, k$, the hinges being positioned adjacent to the inner side of the rim, so that the toggle section 2, may be depressed inward centrally as shown in Figs. 3 and 5. It will be noted, by reference more particularly to Figs. 4 and 5, that in either position of the toggle the medial pintle $p'$, is beyond the line of dead center, i. e., the plane of the shortest line between the pintles $p$, $p$, which secure the toggle levers 21, 22, to the main section 1, of the rim, as indicated by the dotted lines $c$, in said figures, so that the resilience of the main section 1 will tend constantly to maintain the toggle section 2, in either position. Thus in Figs. 1, 2, 4 and 6, the outer end shoulders 3, 3, of the levers 21, 22, are held in contact with the shoulders 11, 11, on the ends of the main section of rim 1, whereas in Figs. 3, 5 and 7, the beveled medial shoulders 4—4, of the toggle, contact, and limit the inward flexure or depression of the toggle,—it being understood of course that the resilient tendency of the main section 1, of the rim is to contract as indicated by the solid lines in Fig. 3, and that the forcing outward of the toggle levers 21, 22, into annular alinement with the main portion 1, of the rim, expands the latter, as indicated by the dotted lines in said Fig. 3.

Hence is will be seen that by depressing the toggle section 2, of the rim the latter will be contracted sufficiently in diameter and circumference to admit of its removal from or insertion within the shoe or tread T, of the wheel, thereby simplifying and facilitating the operation of tire mounting.

The inner sides of the toggle levers 21, 22, are formed with shoulders 5, 5, for engagement with corresponding peripheral shoulders $f$, $f$, on the wheel felly, as shown in Figs. 1 and 2, of the drawings, thereby preventing the creeping of the rim circumferentially on said felly. These shoulders 5—5, on the toggle sections 21—22, acting in conjunction with the corresponding shoulders $f$, $f$, on the felly, form a distinctive feature in our construction and arrangement of parts, and add materially to the effectiveness and utility of our demountable rim by locking the toggle sections on the felly by simple means, and without resort to extraneous clamps or devices of any kind for this purpose. In other words, our contractible and expansible demountable rim is self-contained and unitary in this respect, and complete in every particular, not being dependent upon extraneous means of attachment or manipulation.

What we claim as our invention and desire to secure by Letters Patent is—

A transplit demountable rim comprising a major section having its ends spaced apart and connected by a two part inwardly opening toggle, the sections thereof being pivoted together and to the ends of the major section, the inner sides of the toggle sections being provided with transversely extending oppositely facing shoulders together adapted to act as a driver.

AIMEE HART MOMEYER.
GEORGE M. MOMEYER.

Witnesses:
DOROTHY MIATT,
GEO. WM. MIATT.